United States Patent
Itokawa

(10) Patent No.: US 7,403,710 B2
(45) Date of Patent: Jul. 22, 2008

(54) IMAGE PROCESSING APPARATUS AND IMAGE PROCESSING METHOD

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/563,038

(22) PCT Filed: Sep. 9, 2005

(86) PCT No.: PCT/JP2005/017097
§ 371 (c)(1),
(2), (4) Date: Dec. 30, 2005

(87) PCT Pub. No.: WO2006/030880
PCT Pub. Date: Mar. 23, 2006

(65) Prior Publication Data
US 2007/0110417 A1    May 17, 2007

(30) Foreign Application Priority Data
Sep. 15, 2004   (JP) ............................. 2004-268708

(51) Int. Cl.
*G03B 41/00* (2006.01)
(52) U.S. Cl. .................. 396/333; 396/334; 396/335; 396/337; 348/208.99; 348/221.1; 348/262; 348/353; 348/362; 348/370; 348/371

(58) Field of Classification Search .................. 396/89, 396/165, 332, 333, 334, 335, 337; 382/174, 382/190, 206, 212, 255, 270, 274, 282, 283, 382/284; 348/216.1, 217.1, 221.1, 262, 267, 348/353, 362, 370, 371, 208.99
See application file for complete search history.

(56) References Cited

U.S. PATENT DOCUMENTS

2002/0122133 A1 * 9/2002 Ejima ......................... 348/362
2003/0137597 A1 * 7/2003 Sakamoto et al. ........... 348/371

FOREIGN PATENT DOCUMENTS

| JP | 9-261526 | 10/1997 |
|---|---|---|
| JP | 2000-307941 | 11/2000 |
| JP | 2002-044510 | 2/2002 |
| JP | 2003-46848 | 2/2003 |

OTHER PUBLICATIONS

International Search Report dated Apr. 18, 2006.
Written Opinion of International Search Report dated Apr. 18, 2006.

* cited by examiner

*Primary Examiner*—W. B. Perkey
*Assistant Examiner*—Michael A Strieb
(74) *Attorney, Agent, or Firm*—Morgan & Finnegan, LLP

(57) ABSTRACT

This invention provides an image processing apparatus that corrects an image blur by using a plurality of images acquired by image capturing means. The apparatus comprises: blur detection means that detects a blur amount between the plurality of images; image composition means that performs the composition of the plurality of images using the detected blur amount; acquisition means that acquires, based on a difference value between the plurality of images and a threshold value thereof, region data for separating the image into regions by changing the threshold value; and display means that selectably displays the region data for each threshold value.

3 Claims, 17 Drawing Sheets

F I G. 9
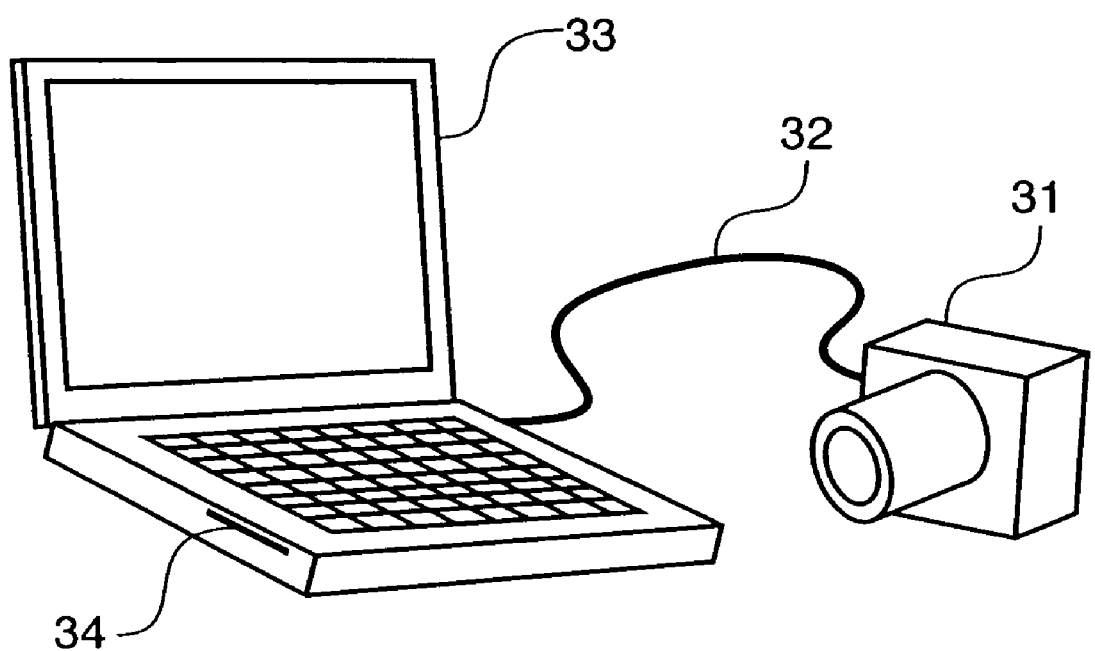

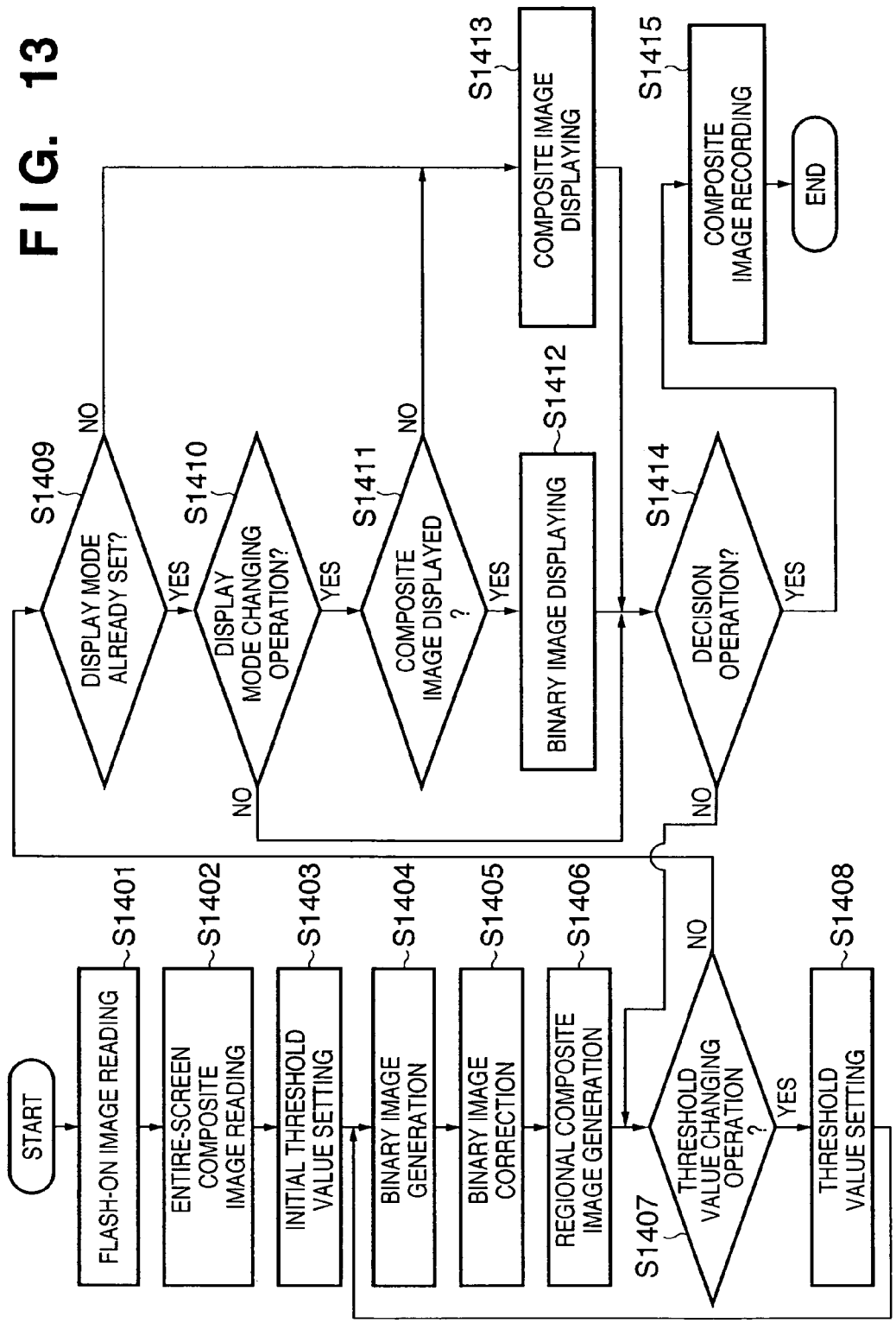

FIG. 15

| HEADER DATA |
|---|
| RAW DATA |
| ADDITIONAL DATA |

IMAGE PROCESSING APPARATUS AND IMAGE PROCESSING METHOD

TECHNICAL FIELD

The present invention relates to an image processing technique of performing a composition of a plurality of photographed images and acquiring a most appropriate image.

BACKGROUND ART

A camera shake (hand shake) or the like at the time of photographing by a digital camera sometimes causes a blur in an image. In order to prevent such blur, it is preferable to photograph an image at a fast shutter speed. However, since the most appropriate shutter speed is determined based on the relations among a luminance of an object, a stop value, and sensitivity of the image capturing device, for instance, in a case where an object has a low luminance, there are cases that a slow shutter speed must be set in addition to a maximum stop value in order to secure a necessary light exposure. In this case, there are measures to prevent a blur: increase the sensitivity of the image capturing device, fix the camera by a tripod, photograph with a flash, and so on.

However, when an image is photographed with an increased sensitivity of the image capturing device, the photographed image will contain conspicuous noise. Moreover, photographing with a tripod will limit places of photographing. Further, photographing with a flash cannot adapt to a long-range object where the flash lamp cannot reach.

In view of these problems, a method of substantially securing a necessary exposure amount by photographing a plurality of images at short photographing intervals at a fast shutter speed and performing a composition of the plurality of photographed images has been proposed (Japanese Patent Application Laid-Open No. 9-261526).

However, in the method of acquiring an appropriate-exposure image by the conventional plural-image compositions, a problem occurs when performing a composition of images in "slow-synchro" photographing.

The "slow-synchro" photographing is used, for instance, in a case of photographing a person in a night scene. It is designed as a measure for a case where the flash lamp reaches the person but does not reach the background, so that an intended photograph image cannot be captured. It enables to slow down the shutter speed in accordance with the lightness of the background, and in synchronization with the flash, the person and the background are captured.

FIGS. 17A to 17E are views explaining a compositions of plural-images in the slow-synchro photographing. FIGS. 17A to 17D show examples of plural pieces of images obtained in the slow-synchro photographing mode. FIG. 17A shows an image obtained with a flash, in which colors and lightness of the person are appropriate but the background is dark because of an underexposure. The images in FIGS. 17B to 17D are photographed with short exposure time without using a flash. Due to the short exposure time, all images are entirely dark. A composition of these four images produces the image in FIG. 17E. By superposing these four images, the background region can achieve appropriate lightness. However, as to the person region, despite the appropriate lightness achieved only in FIG. 17A, since image data in FIGS. 17B to 17D are superposed, appropriate colors and lightness are lost. As in this example, when the screen includes mixed regions whose appropriate exposures are different, it is necessary to perform different processing for each region.

DISCLOSURE OF INVENTION

The present invention has been proposed in view of the above problems, and has as its object to provide an image processing apparatus and an image processing method which can compose a most appropriate image in units of region, when adopting a method of performing a composition of a plurality of images and acquiring an image having an appropriate exposure.

In order to solve the above-described problems, the invention provides an image processing apparatus (or image processing method) that corrects an image blur by using a plurality of images acquired by image capturing means, characterized by comprising: blur detection means (step) for detecting a blur amount between the plurality of images; image composition means (step) for performing a composition of the plurality of images using the detected blur amount; acquisition means (step) for acquiring, based on a difference value between the plurality of images and a threshold value thereof, region data for separating the image into regions by changing the threshold value; and display means (step) for selectably displaying the region data for each threshold value.

Furthermore, the invention provides an image processing apparatus (or image processing method) that corrects an image blur by using a plurality of images acquired by image capturing means, characterized by comprising: blur detection means (step) for detecting a blur amount between the plurality of images; image composition means (step) for performing a composition of the plurality of images using the detected blur amount; acquisition means (step) for acquiring, based on a difference value between the plurality of images and a threshold value thereof, region data for separating the image into regions by changing the threshold value; and correction means (step) for correcting the region data acquired for each threshold value.

Note that the present invention is valuable also in a case of employing the above-described image processing method as a program that causes a computer to execute the image processing method, or as a computer-readable storage medium that stores the program.

As described above, since the present invention enables acquisition of region data from a plurality of images and selection of a composite image in units of region, it is possible to acquire an entirely appropriate composite image.

Furthermore, by obtaining region data from a plurality of images and performing correction, accurate region data can be obtained, and an entirely appropriate composite image can be acquired.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 is an explanatory view of a system in which a camera according to the fourth embodiment of the present invention is connected to a personal computer;

FIG. 13 is a flowchart describing regional composite image generation, displaying, and recording processing according to the third embodiment of the present invention;

FIG. 15 is a view showing an example of an image data file format according to the fourth embodiment of the present invention;

BEST MODE FOR CARRYING OUT THE INVENTION

Hereinafter, preferred embodiments of the present invention will be described in detail in accordance with the accompanying drawings.

FIRST EMBODIMENT

Figure 1:
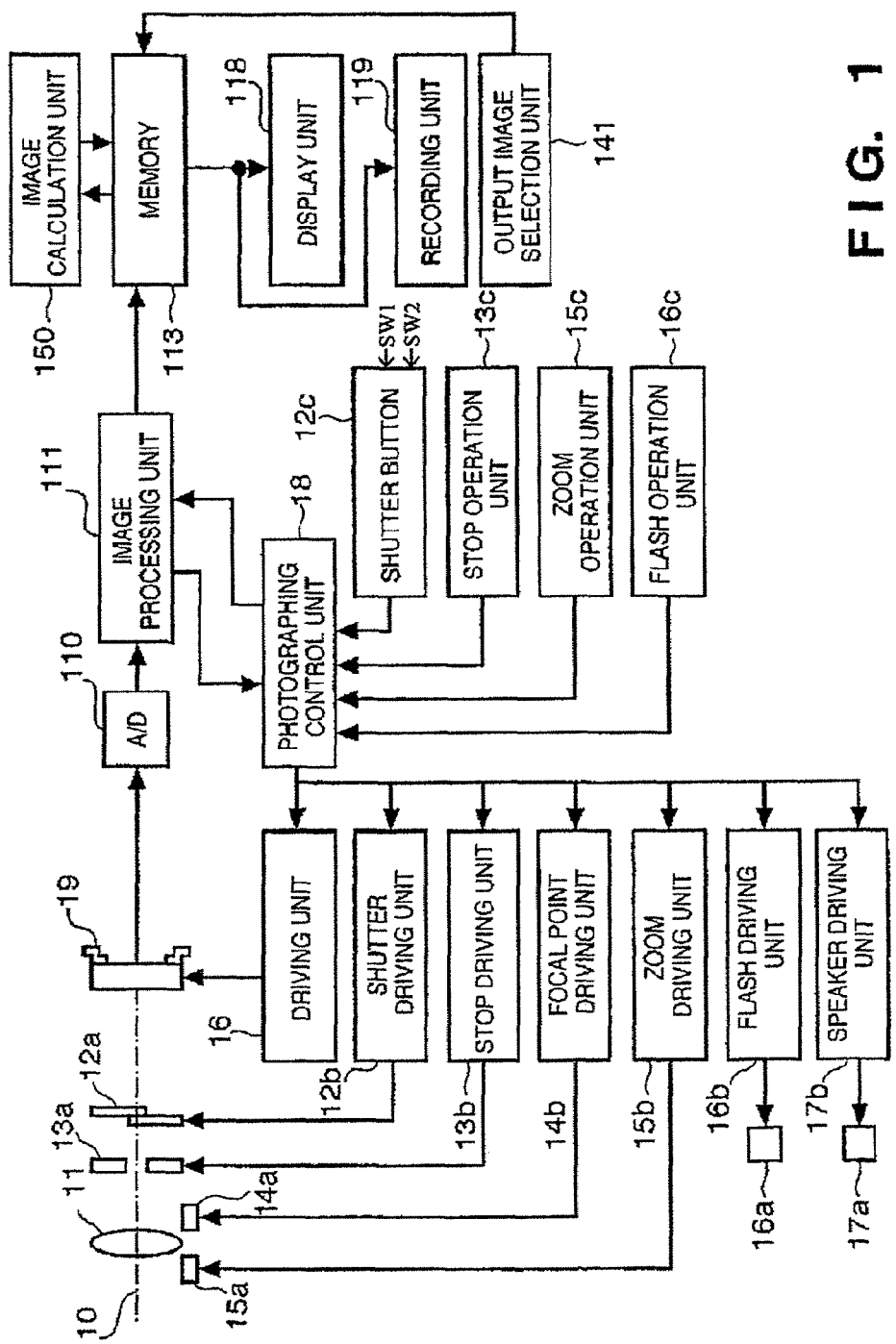
FIG. 1 is a block diagram showing an example of a construction of a digital camera according to the first embodiment of the present invention.

FIG. 1 is a block diagram showing a construction of a digital camera, which is an example of an image processing apparatus according to the first embodiment of the present invention. Note that the image processing apparatus according to the first embodiment is not limited to a digital camera, but may be realized by an image capturing apparatus, such as a digital video camera, a camera mobile telephone, a computer with a camera, and so on.

Incident light flux (photographing light) from a photographing lens 11 is subjected to light-amount limitation by a stop 13a, goes through a shutter 12a, and forms an image in an image capturing unit 19.

The image capturing unit 19 converts the received light to an image signal, using an image capturing unit such as a CMOS image sensor, a CCD image sensor or the like.

The photographing lens 11 is further constructed with plural optical lenses. Part or all of these lenses move along the optical axis 10 in response to driving force of an AF driving motor 14a and stop at a predetermined focalized position, thereby adjusting the focal point.

The AF driving motor 14a is driven when it receives a driving signal from a focal point driving unit 14b.

Part of the optical lenses of the photographing lens 11 moves along the optical axis 10 when they receive driving force from the zoom driving motor 15a, stops at a predetermined zoom position, thereby changing a photographing angle of field. The zoom driving motor 15a is driven by receiving a driving signal from a zoom driving unit 15b.

The stop 13a has a plurality of aperture blades. These aperture blades are operated by receiving a driving force from a stop driving unit 13b to change an aperture area (aperture diameter), which serves as a light passage hole.

The shutter 12a has a plurality of shutter blades. These shutter blades open or close an opening portion, which serves as a light passage hole, by receiving a driving force from a shutter driving unit 12b. By this operation, light flux incident upon the image capturing unit 19 is controlled.

In accordance with a condition at the time of photographing (object luminance and so on), the flash 16a is driven (light emission) by receiving a driving signal from a flash driving unit 16b.

Further, a speaker 17a for notifying a photographer of a photographing operation is driven (sound production) by receiving a driving signal from a speaker driving unit 17b.

Driving the focal point driving unit 14b, the zoom driving unit 15b, the stop driving unit 13b, the shutter driving unit 12b, the flash driving unit 16b, and the speaker driving unit 17b is controlled by a photographing control unit 18.

To the photographing control unit 18, operation signals from a shutter button 12c, a stop operation unit 13c, a zoom operation unit 15c, and a flash operation unit 16c are inputted. In accordance with the photographing state of the digital camera, the operation signals are respectively provided to the shutter driving unit 12b, the stop driving unit 13b, the focal point driving unit 14b, the zoom driving unit 15b, and the flash driving unit 16b to set a photographing condition, and photographing is performed. Note that the shutter button 12c includes a first release switch (SW1) which is turned on by half stroke of the shutter button, and a second release switch (SW2) which is turned on by full stroke of the shutter button.

Note that since the aperture diameter of the stop 13a and light emission of the flash 16a are normally set automatically by the digital camera at the time of photographing, the stop operation unit 13c and the flash driving unit 16b are not necessary. However, they are provided for a case where a photographer arbitrarily sets photographing conditions.

The photographing control unit 18 measures an object luminance (light metering) based on an image signal inputted to an image processing unit 111 which will be described later, and decides an aperture diameter of the stop 13a and the closure timing of the shutter 12a (exposure time) based on the result of light metering.

Further, the photographing control unit 18 obtains a focalized position of the photographing lens 11 based on an output from the image processing unit 111, while driving the focal point driving unit 14b.

An image signal outputted from the image capturing unit 19 is converted to a digital image signal by an A/D converter 110, and inputted to the image processing unit 111.

The image processing unit 111 generates image data corresponding to the photographed image based on the digital image signal sent from the A/D converter 110.

The image data generated by the image processing unit 111 is stored temporarily in a memory 113. An image calculation unit 150 reads the image data stored in the memory 113, performs processing, and writes the image data again in the memory. The image to be recorded finally is decided while looking at the image on a display unit 118 in accordance with an operation of an output image selection unit 141. The selected image is recorded in a recording medium such as a memory card by a recording unit 119.

Figure 2:
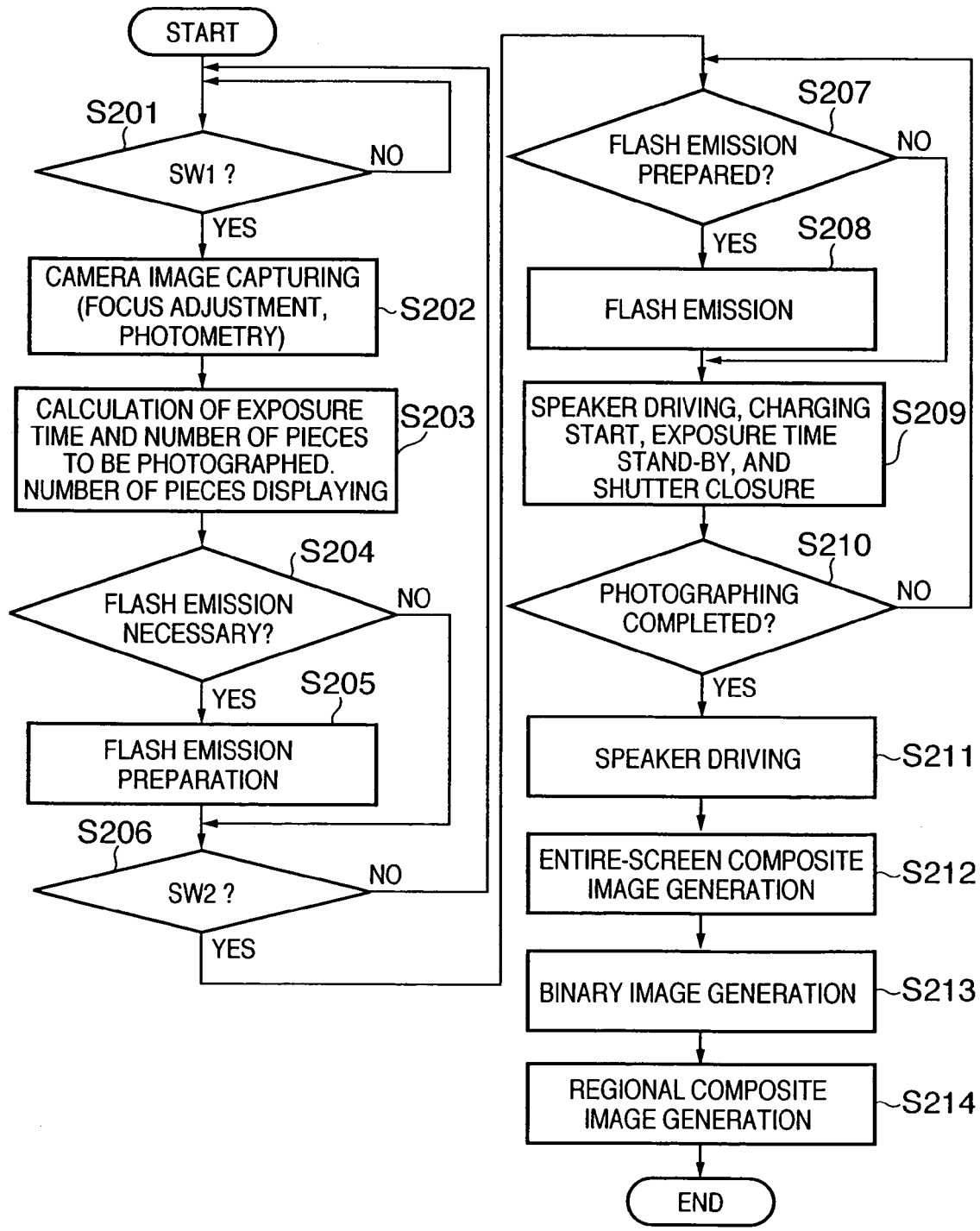
FIG. 2 is a flowchart describing processing executed by the digital camera according to the first embodiment of the present invention.

FIG. 2 is a flowchart summarizing a photographing operation. The flowchart starts when the power of the digital camera is turned on. Herein, an operation at the time of slow-synchro photographing is described in particular.

In step S201, a photographer performs half-stroke depression of the shutter button 12c. Until the photographer performs photographing preparation operation, the control stands by circulating this step. When the first release switch (SW1) is turned on, the control proceeds to step S202.

In step S202, an object is captured by the image capturing unit 19. While the image processing unit 111 detects the contrast of the image, the photographing control unit 18 extends the lens 11 by driving the AF motor 14a, and stops the extension of the lens 11 at the position having the highest contrast. At the same time, the image processing unit 111 obtains lightness of the object based on the output from the image capturing unit 19.

In step S203, the number of pieces to be photographed and the respective exposure time are calculated based on the photographing conditions such as the lightness of the object obtained in step S202.

Herein, the photographing conditions include the following four points:

lightness of the object, focal length of the photographing optical system, lightness of the photographing optical system (stop value), and sensitivity of the image capturing device.

Assume that the sensitivity of the image capturing device is set in ISO speed 200.

Based on the lightness of the object measured, assume that the calculation finds that the stop 13a needs to be set in a maximum aperture (e.g., f2.8) and that the shutter 12a needs an exposure time ⅛ (second) to give an appropriate exposure to the object.

In this case, if the focal length is 30 mm in a 35-mm film, photographing with the exposure time ⅛ is more likely to cause a camera-shake blur. In view of this, exposure time 1/32 which is less likely to cause a camera-shake blur is set, and four-time photographing is set.

Similarly, if the focal length is 300 mm, exposure time 1/320 which is less likely to cause a camera-shake blur is set, and forty-time photographing is set.

In the above-described manner, the exposure time in a case of photographing plural pieces is determined in accordance with the photographing conditions. Further, the number of pieces to be photographed is also set in accordance with the photographing conditions.

Upon completion of the above calculation, the number of photographing pieces calculated is displayed on a digital camera finder or a liquid crystal display to notify the photographer.

Moreover, in the case of slow-synchro photographing, it is determined in step S204 that flash emission is necessary. In step S205, preparation of flash emission is performed.

In step S206, it is determined whether or not the shutter button 12c is depressed to the full-stroke. If the shutter button 12c is depressed to the full-stroke, the second release switch (SW2) is turned on.

When the second release switch (SW2) is turned on, photographing for the first piece is started.

In step S207, it is determined whether or not preparation of flash emission has been performed. When slow-synchro photographing is performed, flash emission has been prepared in step S205. Therefore, flash emission is performed in step S208. In step S209, an electric charge of the image capturing unit 19 is reset, and recharging is started.

Then, the apparatus stands by for the exposure time calculated in step S203, closes the shutter, and transfers the charge. At the same time, the sound indicating the start of photographing is produced by the speaker 17a through the speaker driving unit 17b.

The sound may be of, e.g., a bleep, shutter click sound of a filmed camera, or mirror-up sound.

In step S210, the controls stands by circulating steps S207 to S209 until all the photographing is completed. In slow-synchro photographing, since flash emission preparation in step S207 is not performed after the second time on, photographing is performed without flash emission. When photographing is completed, the control proceeds to step S211.

In step S211, the sound indicative of photograph completion is produced by the speaker 17a through the speaker driving unit 17b.

The sound may be of, e.g., a bleep, shutter closure sound of a filmed camera, mirror-down sound, or film rewinding sound.

As described above, even in a case of photographing plural pieces, the sound representing the operation is only one set (once from the start of the exposure for initial photographing till the completion of exposure for the last photographing). Therefore, it does not bother the photographer with the plural pieces of photographing.

Figure 3:
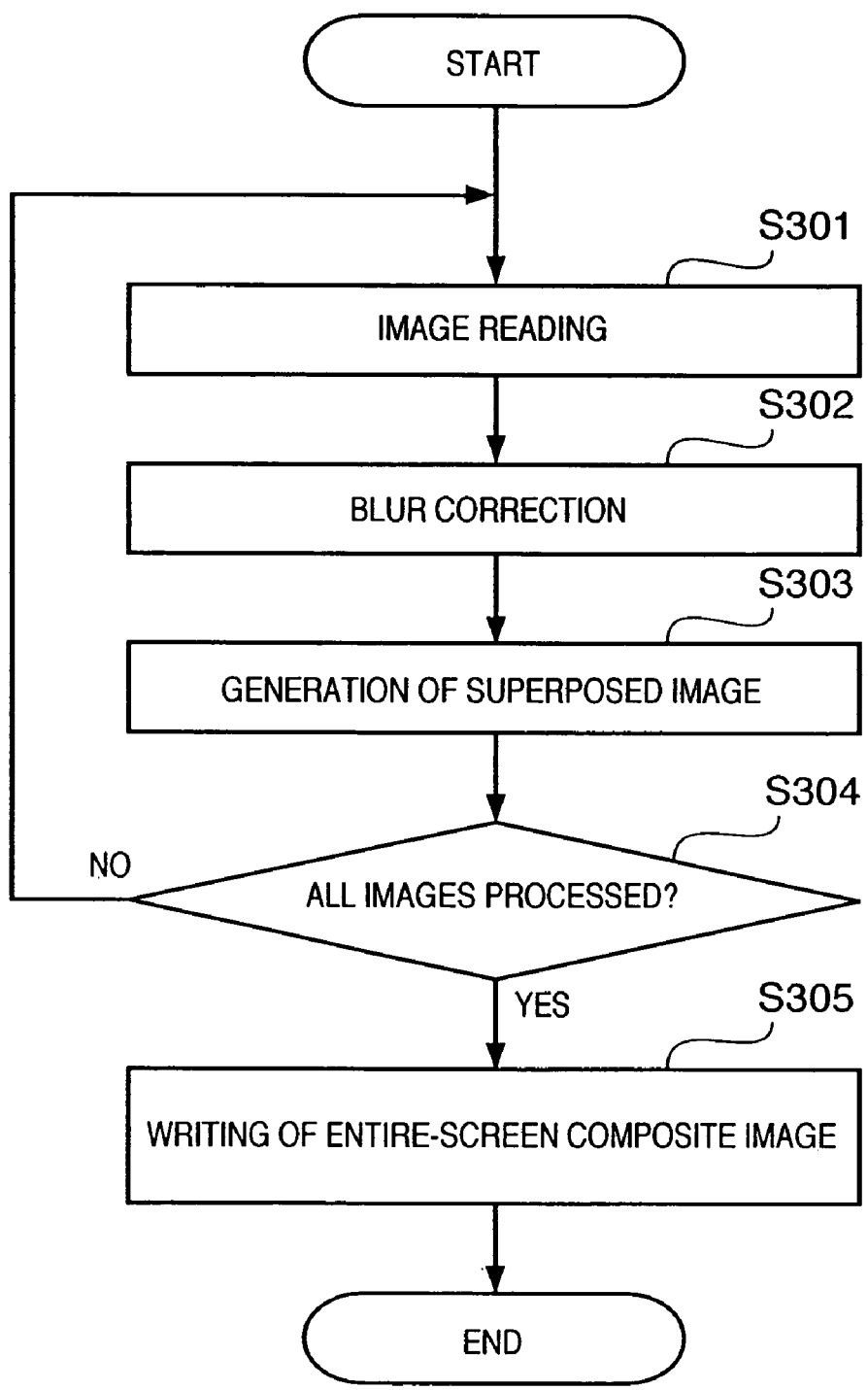
FIG. 3 is a flowchart describing generation processing of an entire-screen composite image according to the first embodiment of the present invention.

Step S212 and the following steps are the image processing for generating a composite image based on the plural pieces of photographed images. In step S212, positions of the plural pieces of photographed images are aligned, and one composite image is generated. In step S213, a binary image used for regional separation is generated based on the composite image generated in step S212 and the piece of image photographed with flash emission. In step S214, a composite image is generated in units of region using the binary image, and a piece of most appropriate image is completed. FIG. 3 is a flowchart describing in detail generation of an entire-screen composite image explained in step S212 in FIG. 2. Herein, a description is provided assuming that the number of images to be superposed is four. In step S301, the first piece of image is read out of the memory. Next in step S302, blur correction is performed. In a case where the first piece of image is used as a reference, correction processing is not necessary. In step S303, corrected images are superposed. The first piece of image is temporarily stored as it is. In step S304, it is determined whether or not the correction processing is performed to all images. The processing of steps S301 to S304 is repeated until all the corrected images are superposed. After the second piece of image is read in step S301, in step S302 how much the position is deviated compared to the first piece of image is detected. Then, correction is performed for the detected amount of deviation. In step S303, the first piece of image and the corrected second piece of image are superposed. The similar processing is performed for the third and fourth pieces of images. When the fourth piece of image is superposed, the control proceeds from step S304 to step S305, then the image is written in the memory.

Figure 4:
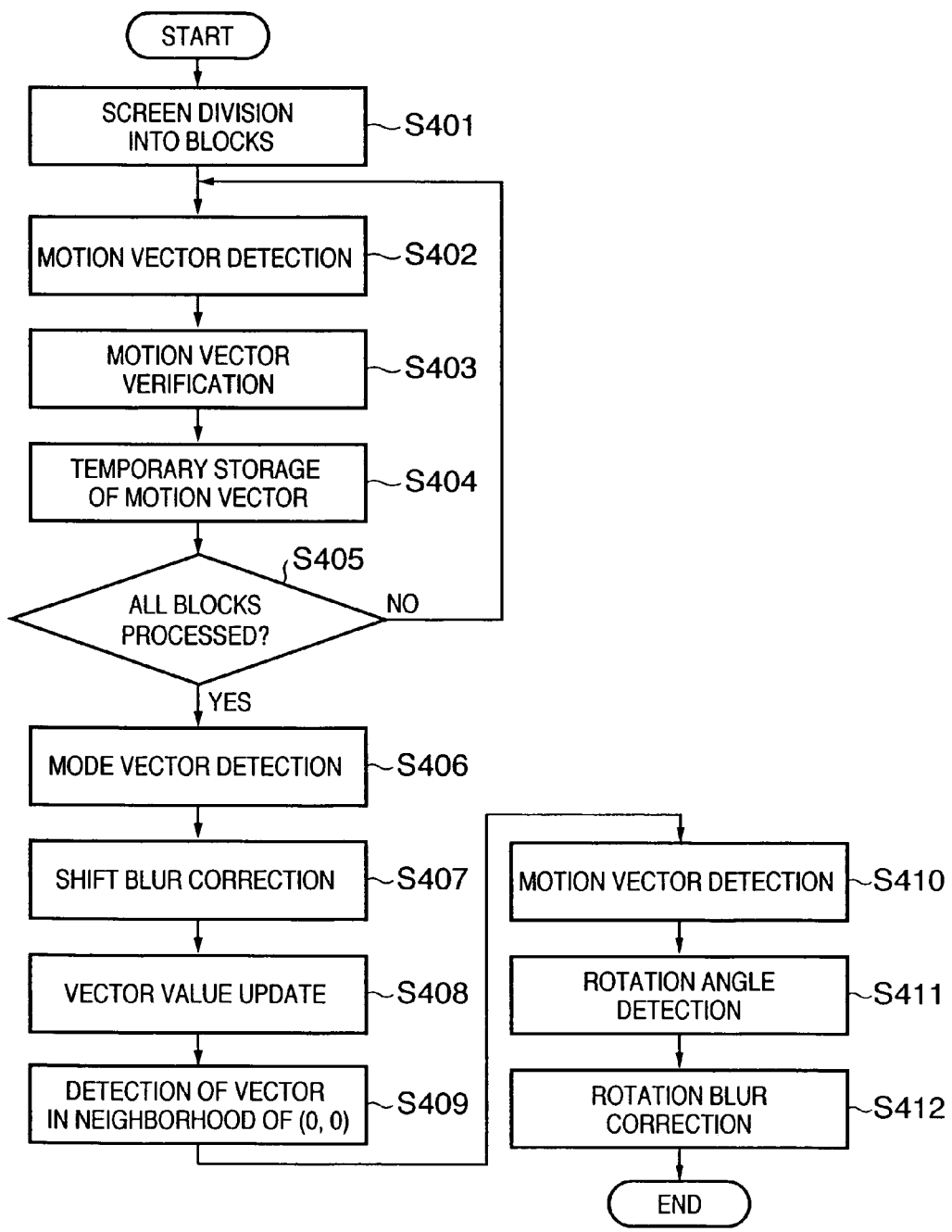
FIG. 4 is a flowchart describing blur correction processing according to the first embodiment of the present invention.

The blur correction processing explained in step S302 in FIG. 3 is further described in detail with reference to the flowchart in FIG. 4. Described herein is a method of estimating an overall motion by matching processing in units of block to correct a blur. In step S401, the screen is divided into small blocks of about 16 pixels×16 pixels. Although the size of the block is arbitrary, if the block is too small, correct matching is difficult to perform, and if the block is too large, the processing load increases. In step S402, motion vectors are detected in units of divided block. The motion vector is the horizontal and vertical deviation amount between matched images. In step S403, verification of the motion vectors is performed. This is the processing for verifying likelihood of whether or not the calculated motion vector is correct. In normal matching performed between a block of interest and a reference image, the sum of squares of a difference or the sum of absolute values of a difference is obtained while changing the target position pixel by pixel, and the position having the smallest calculation value is obtained as the matching position. Therefore, even if matching is not found, one of the positions in the searched region is obtained as a calculated result. Such motion vector erroneously obtained is characterized by, e.g., having a maximum value in the searched region. Utilizing this characteristic, erroneous motion vectors are eliminated. In step S404, obtained motion vectors are temporarily stored for the latter processing. The processing in steps S402 to S404 is repeated for the entire blocks of one screen. After the processing is completed for the entire screen in step S405, a mode vector is detected in step S406. This is to obtain a motion vector having a highest occurrence frequency in the motion vectors temporarily stored, and assume that the motion amount of the vector is a shift blur of this screen. In step S407, the mode vector value is corrected as the shift blur amount. Correction of a shift blur is performed in the foregoing manner. Described next is correction of a rotation blur. In step S408, a new vector value is obtained by subtracting the shift blur amount from the vector value obtained before. If the camera-shake blur consists of a shift blur only, theoretically the corrected vector value should be (0, 0). However, if the camera-shake blur includes a rotation blur, a vector value in the neighborhood of (0, 0), that is, (0, 1) or (−1, 0) or the like, is often detected. In step S409, these vector values are detected. In step S410, reliability of these vector values is verified as similar to step S403 described above. In step S411, the rotation angle is calculated based on the reliable vector. Since the calculated rotation angle can be assumed as the rotation blur of this screen, in step S412 the rotation blur correction is performed for the rotation angle. In this manner, a shift blur and a rotation blur are corrected and position alignment is completed. Herein although the rotation blur correction is performed after the shift blur correction, a shift amount and a rotation angle may be obtained first and correction may be performed all at once. Alternatively, shift blur correction may be performed first, then a motion vector may be obtained again to calculate a rotation blur.

Next, details will be described on the binary image generation in step S213 in FIG. 2 with reference to the flowcharts in FIGS. 5 and 6. A binary image is region separation data necessary to perform separate processing on a region that has received flash and a region that has not received flash. Normally, region data can be obtained as long as there are an image photographed with flash emission and an image photographed without flash emission. However, to improve separation precision, all photographed images are used for generating a binary image. First, a method of generating plural pieces of binary images is described using the flowchart in FIG. 6, then a method of generating one piece of binary image from plural pieces of binary images is described using the flowchart in FIG. 6.

Figure 5:
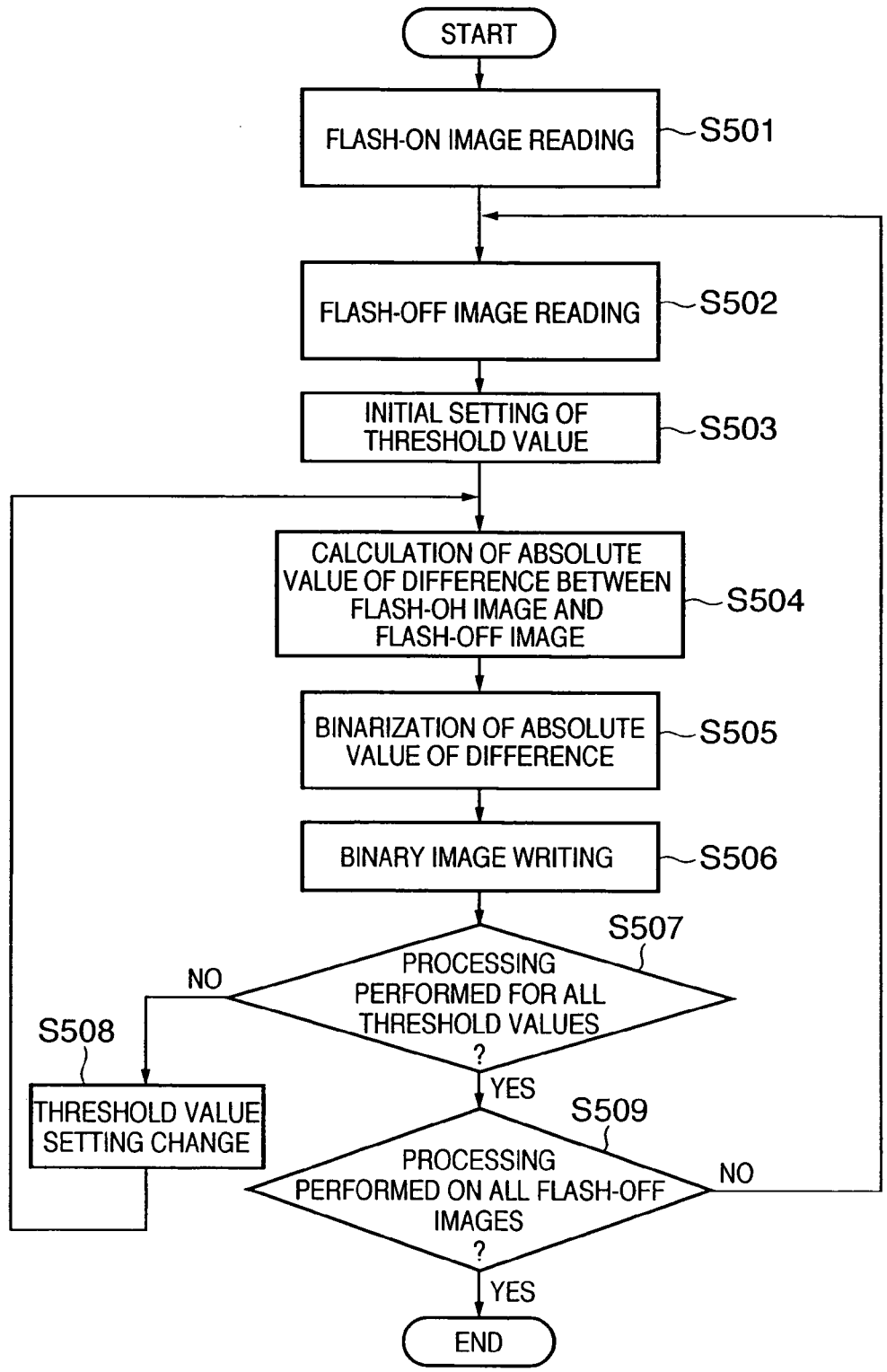
FIG. 5 is a flowchart describing binarization processing of object extraction according to the first embodiment of the present invention.

In step S501 in FIG. 5, an image photographed with flash emission is read out of the memory. Following the previous example, the first piece of photographed image corresponds to this image. In step S502, an image photographed without flash emission, i.e., the second piece of image that has been corrected, is read. Since the positions match in the first piece of image and the corrected second piece of image, if an absolute value of the difference between pixels is calculated, a large difference is found in the portrait region which receives flash and little difference is found in the background region which does not receive flash. By utilizing the difference, it is possible to separate the portrait region from the background region. Herein, since a threshold value for an absolute value of the difference cannot uniquely be determined, in step S503 a threshold value is set in 0 as an initial setting. In step S504, an absolute value of the difference is calculated. In step S505, binary processing is performed; more specifically, if the absolute value of the difference is smaller than the set threshold value, 0 is set; and if the absolute value of the difference is larger than the threshold value, 1 is set. This processing is performed in units of pixel. When processing is completed for the pixels of one screen, the binary image is written in the memory in step S506. In step S508, a threshold value is incremented by one, and processing in steps S504 to S506 is repeated again. When processing is completed with a largest threshold value, the control exits from the loop in step S507, ending the processing on the corrected second piece of image. Next, the control returns to step S502, and a corrected third piece of image is read out of the memory. Similar to the above, a binary image of the first piece of image and the corrected third piece of image is generated for each threshold value. When the processing on the first piece of image and the corrected fourth piece of image is completed, the control exits from the loop in step S509, ending the binary image generation for the number of levels of threshold values×(photographed number of pieces−1).

The binary images obtained in the above description often include erroneous determination of the background region and the portrait region. This is caused because a slight deviation in position alignment causes a large difference value. The deviation occurs at different positions respectively in the first and second pieces, the first and the third pieces, the first and the fourth pieces of the image. Therefore, among the plurality of binary images, only the portion that has been commonly determined as a portrait region is decided as a true portrait region. In this manner, region data of higher precision can be obtained.

Figure 6:
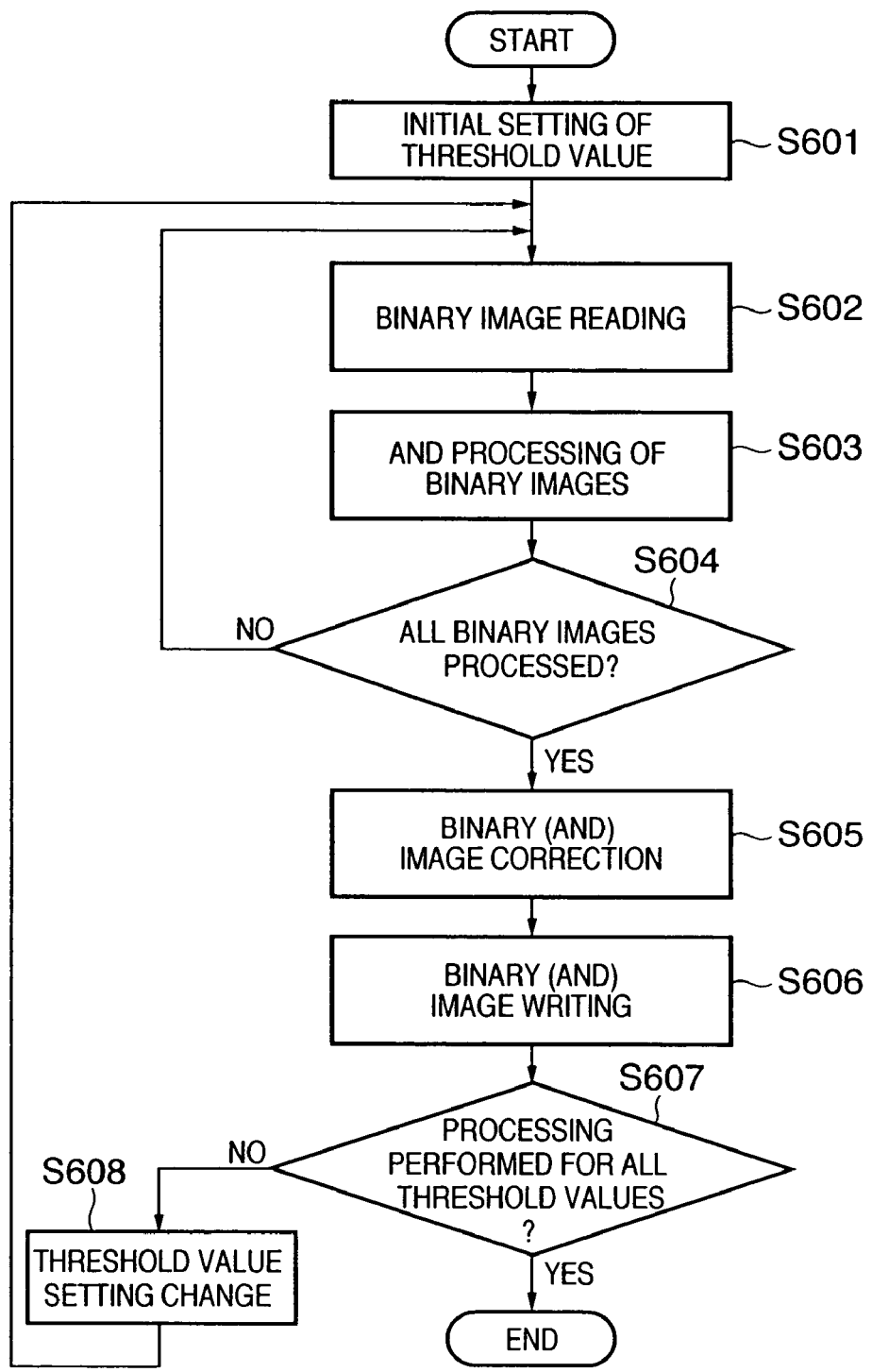
FIG. 6 is a flowchart describing binarized image correction processing according to the first embodiment of the present invention.

A method of generating one piece of binary image from plural pieces of binary images is described using the flowchart in FIG. 6. In step S601, the threshold value is initialized. That is, the threshold value is set in 0 as similar to the description in FIG. 5. In step S602, a binary image is read out of the memory. Herein, the first to be read is a binary image generated based on the difference between the first piece of image and the corrected second piece of image. Step S603 is processing of logical product (AND) between binary images.

However, since only one piece of binary image is read so far, the control returns to step S602 after going through the determination processing in step S604. As the second piece of binary image, an image generated based on the difference between the first piece of image and the corrected third piece of image is read out of the memory. In step S603, logical product (AND) between the two pieces of images is performed. More specifically, only the region determined as a portrait region in both of the images is decided as a new portrait region (1), and other regions are decided to be a background region (0). In the next loop processing, an image generated based on the difference between the first piece of image and the corrected fourth piece of image is read out of the memory (step S602). In the next step S603, AND processing is performed between the read image and the image obtained by the previous AND processing. In step S604, when processing for all the binary images is completed, the control proceeds to step S605. The generated binary image herein is an AND-processed image of the three pieces binary images. In step S605, the AND-processed binary image is further subjected to correction processing. Details of the correction processing will be described later. Upon correction processing, in step S606 the binary image for this threshold value is written in the memory. After going through step S607, in step S608 the threshold value is incremented by 1, and the processing is repeated from step S602. When binary images for all the threshold values are written in the memory, the control exits step S607, ending all the processing for binary image generation.

For a method of further increasing the precision of region data, binary image correction processing is described. The above description ensures improved precision to deal with a deviation in image superposition. More directly, a distance between the camera and the object is measured, and binarization is performed depending on whether or not the object falls within a distance the flash can reach. A sensor capable of measuring a distance based on pixel precision may be employed, but incorporating such sensor in a digital camera is problematic in terms of size and cost. Herein, a method of utilizing sensor data of autofocus (AF) is described. The method bases upon the idea that, in slow-synchro photography, the region focused by autofocus matches the region that receives flash.

Figure 7A:
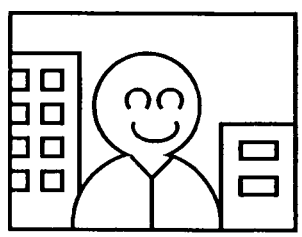
FIGS. 7A to 7F are explanatory views of binarized image correction processing utilizing AF data according to the first embodiment of the present invention.
Figure 7B:
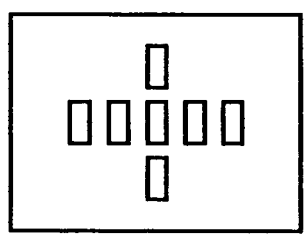
Figure 7C:
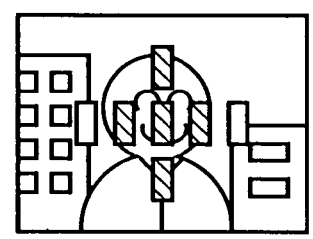
Figure 7D:
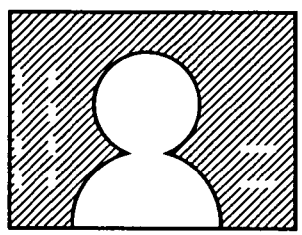
Figure 7E:
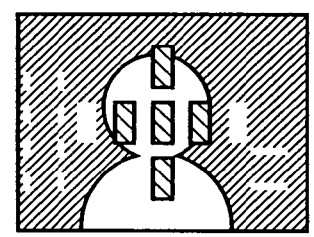
Figure 7F:
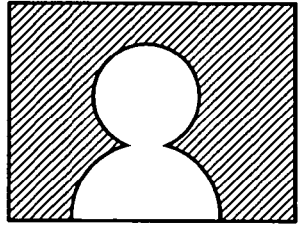

The binary image correction processing is described with reference to FIGS. 7A to 7F. Assume now a case of photographing with a composition shown in FIG. 7A. If AF sensors of the digital camera are arranged as shown in FIG. 7B, when the release button is depressed by half stroke, the portrait region becomes focused. In the viewfinder, a focused state can be confirmed at five regions near the center of the sensors as shown in FIG. 7C. Assuming that a generated binary image is FIG. 7D, if the binary image is superposed on the result shown in FIG. 7C, FIG. 7E is obtained. By removing the background region that does not include the five focused regions, a highly precise corrected image shown in FIG. 7F can be obtained.

Figure 8:
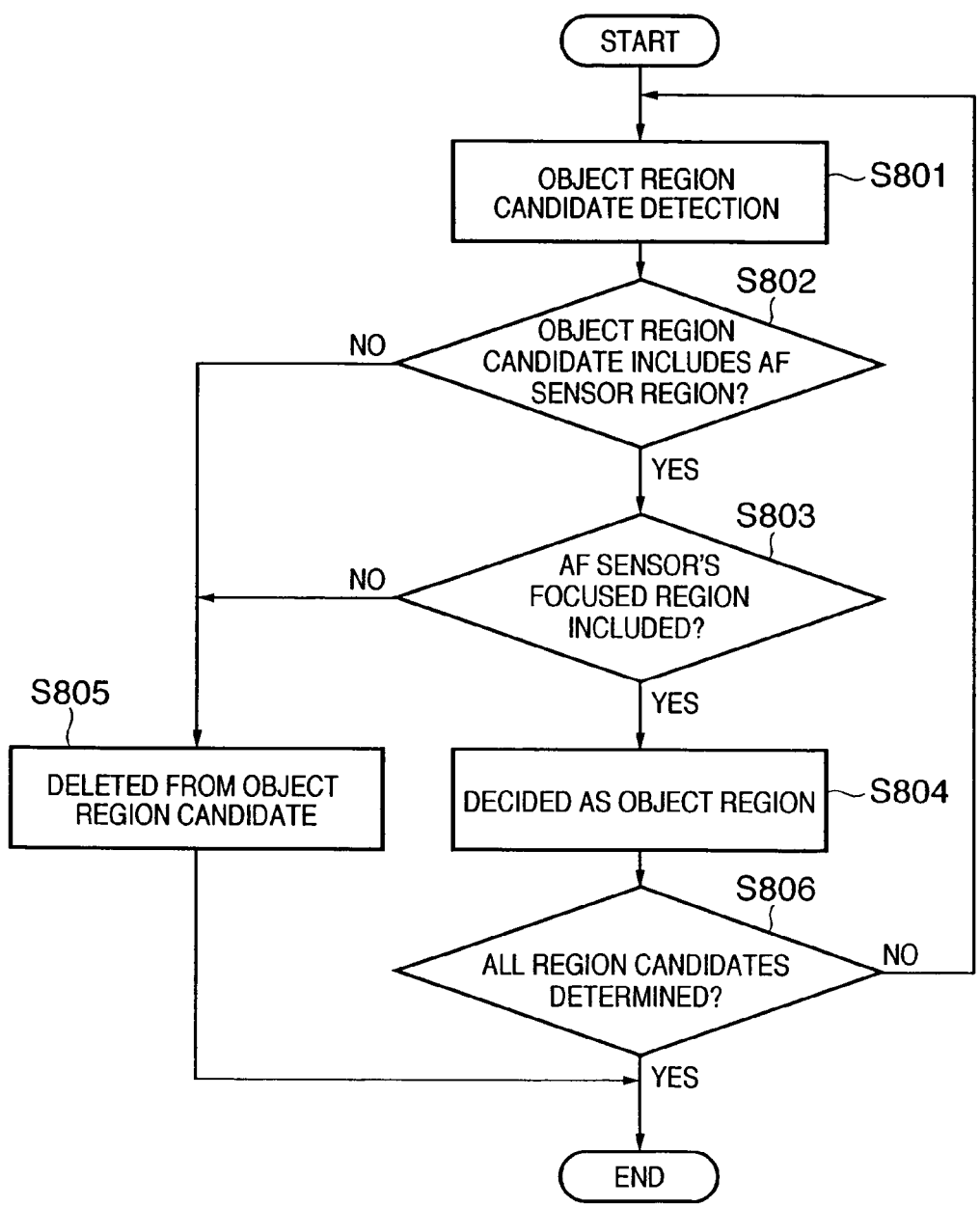
FIG. 8 is a flowchart describing binarized image correction processing utilizing AF data according to the first embodiment of the present invention.

The flow of this processing is described using the flowchart in FIG. 8. In step S801, an object region candidate is detected. The region determined as a portrait region in the previous processing is detected as the region candidate. In other words, a region having binary image value 1 is sequentially detected in the screen. In step S802, it is determined whether or not the detected region candidate includes an AF sensor region. If the candidate does not include an AF sensor region, this data cannot be used. Since such region is often a very small area or an end portion of the screen, the data is deleted from the object region candidates in step S805. If the candidate includes an AF sensor region, this data is used in step S803. In other words, if the candidate includes the sensor's focused area, the candidate is decided as the object region in step S804. If the candidate does not include the sensor's focused area, the data is deleted from the object region candidates in step S805. The above processing is performed with respect to each region candidate of the screen. When determination of all region candidates is completed in step S806, the series of correction operation ends.

Next, details of the composite image generation in units of region, which is explained in step S214 in FIG. 2, are described with reference to the flowcharts in FIGS. 10 and 11 as well as FIGS. 14A to 14F. In step S1101, an image photographed with flash emission, i.e., the first piece of image in the previous example, is read out of the memory. In step S1102, an entire-screen composite image described in FIG. 3 is read. In step S1103, the threshold value is initialized. As similar to the description in FIG. 6, the threshold value is set in 0. In step S1104, a binary image is read out of the memory. The binary image is the corrected AND image described in FIGS. 5 to 8. Thereafter, processing is performed in units of pixel. In step S1105, it is determined whether or not the first pixel value of the binary image is 0. If the pixel value is 0, then the pixel is a background region. Thus, the pixel of the entire-screen composite image is selected in step S1106. If the pixel value is 1, then the pixel is an object region. Thus, the pixel of the image photographed with flash emission is selected in step S1107. These steps are repeated with respect to each pixel. When processing of all pixels of one screen is completed, the control exits from the loop in step S1108. The image obtained herein is the composite image for the threshold value 0. The composite image is written in the memory in step S1109. Next, in step S1111, the setting of the threshold value is incremented by 1, and processing is repeated from step S1104. When the threshold value is incremented one by one and regional composite images for all the threshold values are written in the memory, the control exits from the loop in step s1110. By the foregoing processing, regional composite images for each threshold value are generated.

Described next is processing for selecting, by digital camera operation, a regional composite image of the most appropriate threshold value from the regional composite images for each threshold value. As described in the column of the Background of the Invention, since the most appropriate threshold value cannot uniquely be set, it is preferable to select an image to be finally recorded while viewing the resultant image of regional composition. FIGS. 14A to 14F diagrammatically show the back surface of the digital camera, which includes, e.g., a liquid crystal display screen, an electronic dial, and a selection button. By rotating the electronic dial, the threshold value changes, and a regional composite image corresponding to the threshold value is displayed on the liquid crystal display screen. For instance, if the electronic dial is rotated to the right, the threshold value increases. If the electronic dial is rotated to the left, the threshold value decreases. This operation is not limited to an electronic dial, but may be realized by a button operation, or a slide operation on a touch pad. Moreover, a button operation can switch between a binary image and a regional composite image. When the most appropriate threshold value is found while viewing the image displayed on the liquid crystal display screen, an OK button is depressed to record the regional composite image in a recording medium.

Figure 14A:
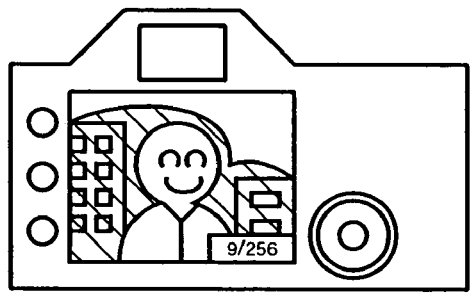
FIGS. 14A to 14F are views showing examples of a user interface for determining a threshold value according to the first embodiment of the present invention.
Figure 14B:
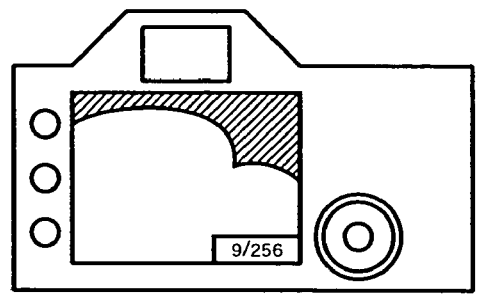
Figure 14C:
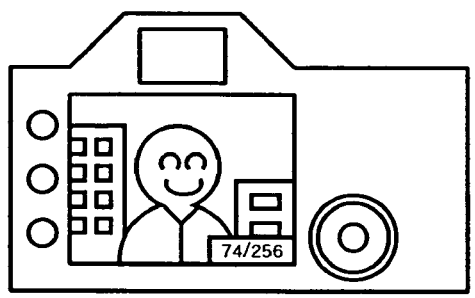
Figure 14D:
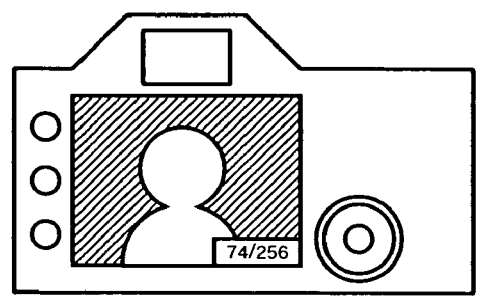
Figure 14E:
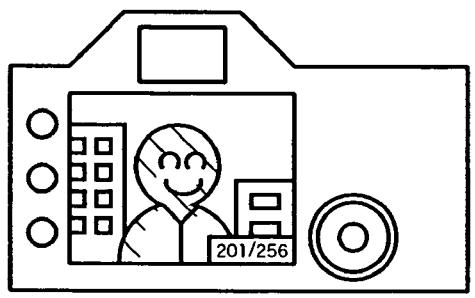
Figure 14F:
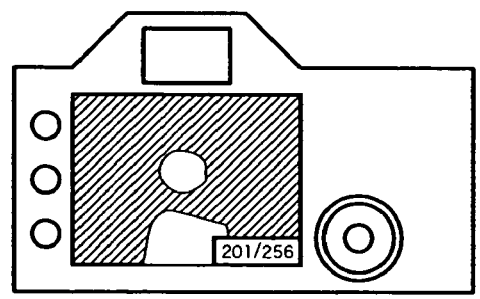

FIG. 14A shows a regional composite image when the value 9 is selected from 256 threshold value levels. FIG. 14B shows a binary image in this setting. When the threshold value is small, the region determined as an object becomes large;

thus, a flash-emitted image is selected for a region wider than an actual person. Therefore, in the shaded region shown in FIG. 14A, an image darker than an appropriate exposure is displayed. FIG. 14C shows a regional composite image when the threshold value level is 74, which is an appropriate value. FIG. 14D shows a binary image in this setting, showing that the object region and the background image are appropriately separated. FIG. 14E shows a regional composite image when the threshold value level is 201, which is a large value. FIG. 14F shows a binary image in this setting, showing that the object region is eroded by the background region. Since the entire-screen composite image is selected for the shaded region in FIG. 14E, an image with an appropriate exposure cannot be displayed.

The operation flow in FIGS. 14A to 14F is described with reference to the flowchart in FIG. 11. In step S1201, the threshold value is initialized in an appropriate value. Then, the regional composite image for this threshold value is displayed in step S1202. Step S1203 is an electronic dial operation described in FIGS. 14A to 14F. In accordance with the dial rotation, a new threshold value is set in step S1204. When a dial operation is not performed, the control proceeds to step S1205. The current mode is confirmed in step S1206. By performing a display-mode changing operation such as a switch depression, the screen can switch between a regional composite image and a binary image. If the currently displayed image is a regional composite image (YES), the screen is switched to a binary-image display in step S1207. If the currently displayed image is a binary image (NO), the screen is switched to a regional-composite-image display in step S1208. If no operation is performed to change the display mode, the control proceeds to the next step. The decision operation in step S1209 is to decide the image to be recorded by an operation such as a switch depression. If a decision operation is not performed, the control returns to step S1203, and waits for one of the threshold value changing operation, the display mode changing operation, or the decision operation. When a regional image to be recorded is decided and the control exits the processing in step S1209, the decided image is recorded in step S1210. Then, all the processing ends.

SECOND EMBODIMENT

Hereinafter, the second embodiment of the present invention is described. First, a difference between the first and second embodiments is described. In the first embodiment, a binary image (explained in FIG. 5), a corrected binary image (explained in FIG. 6), and a regional composite image (explained in FIG. 10) are generated for each threshold value, and written in the memory.

The second embodiment is designed to save the memory resource by not writing the regional composite image for each threshold value in the memory. This can be realized by replacing FIGS. 10 and 11 described in the first embodiment with FIG. 12. Note that descriptions of the common parts between the first and second embodiments are omitted.

Figure 11:
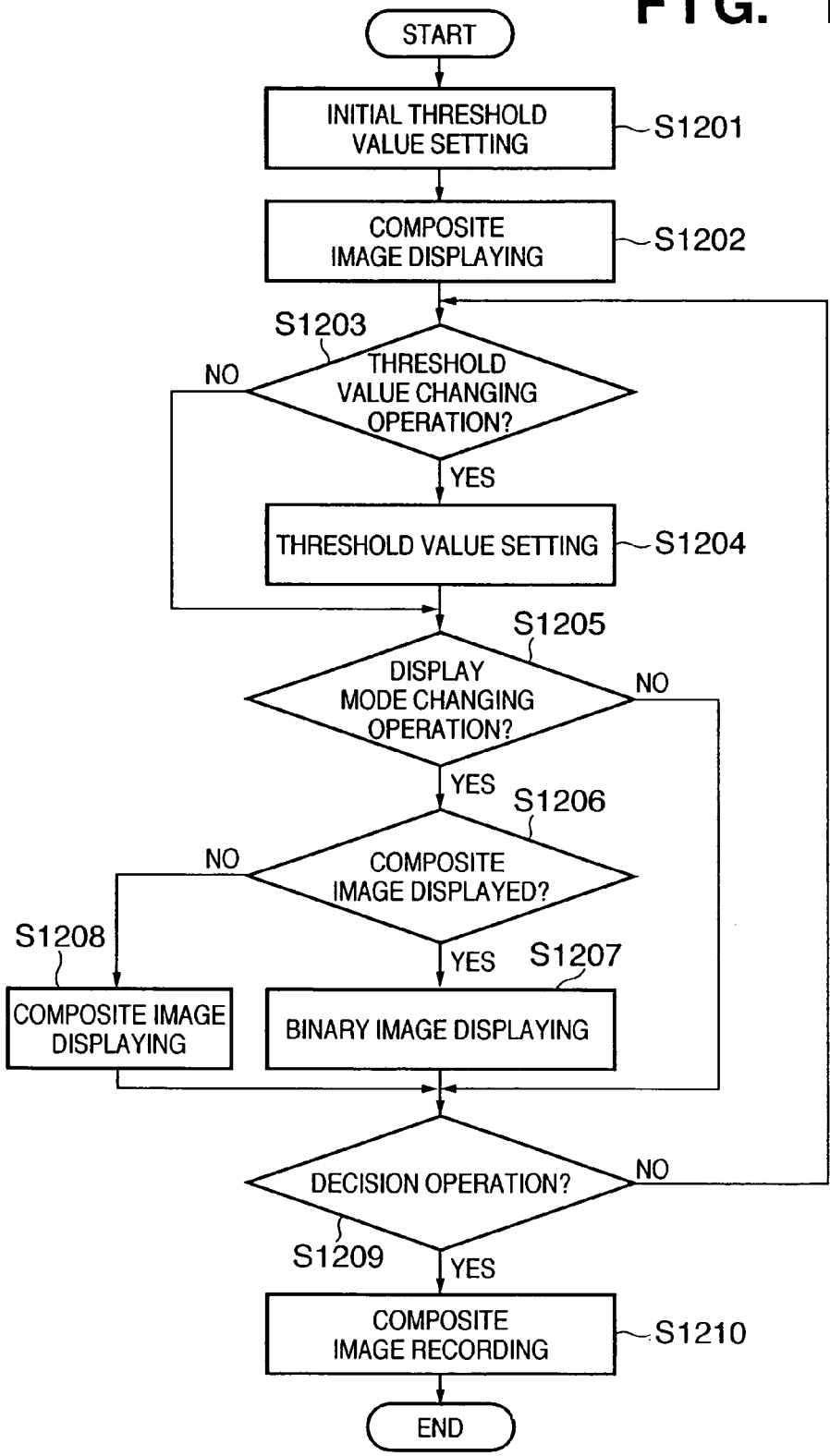
FIG. 11 is a flowchart describing regional composite image displaying and recording processing according to the first embodiment of the present invention.
Figure 12:
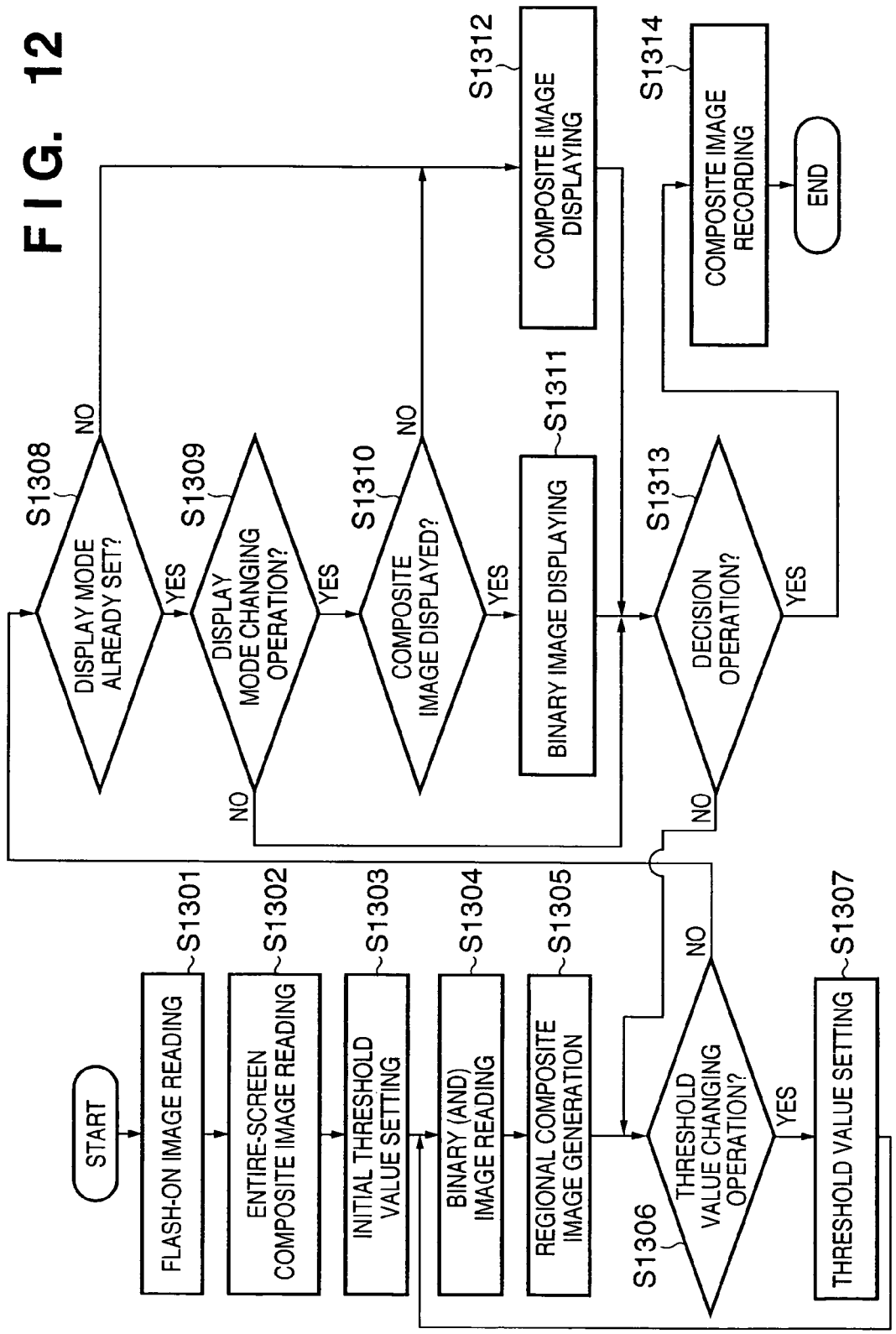
FIG. 12 is a flowchart describing regional composite image generation, displaying, and recording processing according to the second embodiment of the present invention.

The flow of this processing is described with reference to the flowchart in FIG. 12. In steps S1301 and S1302, an image photographed with flash emission and an entire-screen composite image are read out of the memory. In step S1303, the threshold value is initialized. The value may be arbitrary. In step S1304, a binary image for the set threshold value is read out of the memory. This binary image is an image obtained after the AND processing and correction processing described in FIGS. 5, 6, and 8 are performed. In step S1305, a regional composite image is generated based on the image photographed with flash emission, the entire-screen composite image, and the binary image for the set threshold value. The regional composite image generation method is similar to steps S1105 to S1108 in FIG. 10. In step S1306, it is determined whether or not a threshold value changing operation is performed. This operation is performed by the dial operation or the like described in FIG. 11. When the changing operation is performed, a new threshold value is set in step S1307. Then, reading of a binary image corresponding to the new threshold value (step S1304), and generation of a regional composite image (step S1305) are repeated. When a threshold value changing operation is not performed, the control proceeds to step S1308, then it is determined whether or not a display mode is set. If a display mode is not set, a regional composite image is displayed in step S1312. This is the initial setting of the display mode. Thereafter, one of the modes: a binary-image display or a composite-image display, is selected. If the display mode has already been set, it is determined whether or not a display mode changing operation is performed in step S1309. When a display mode changing operation is performed, the current mode is confirmed in step S1310. If the display mode is a composite image display mode, the changing operation is reflected and the screen is switched to a binary image display in step S1311. If the display mode is a binary image display mode, the screen is switched to a composite image display in step S1312. The decision operation in step S1313 is to decide the image to be recorded by an operation such as a switch depression. If a decision operation is not performed, the control returns to step S1306, and waits for one of the threshold value changing operation, the display mode changing operation, or the decision operation. When a regional composite image to be recorded is decided and the control exits the processing in step S1313, the decided image is recorded in step S1314. Then, all the processing ends.

THIRD EMBODIMENT

Hereinafter, the third embodiment of the present invention is described. First, a difference between the first and third embodiments is described. In the first embodiment, a binary image (explained in FIG. 5), a corrected binary image (explained in FIG. 6), and a regional composite image (explained in FIG. 10) are generated for each threshold value, and written in the memory.

The third embodiment is designed to save the memory resource by not writing the binary image, the corrected binary image, and the regional composite image for each threshold value in the memory. This can be realized by replacing FIGS. 6, 10 and 11 described in the first embodiment with FIG. 13. Note that descriptions of the common parts between the first and third embodiments are omitted.

The flow of this processing is described with reference to the flowchart in FIG. 13. In steps S1401 and S1402, an image photographed with flash emission and an entire-screen composite image are read out of the memory. In step S1403, the threshold value is initialized. The value may be arbitrary. In step S1404, a binary image for the set threshold value is generated. The method of binary image generation for the threshold value is realized by omitting the processing of steps S503, S507 and S508 from the flowchart in FIG. 5. In step S1405, the binary image for the set threshold value is corrected. The method of binary image correction for the threshold value is realized by omitting the processing of steps S601, S607, and S608 from the flowchart in FIG. 6. In step S1406, a regional composite image is generated based on the image photographed with flash emission, the entire-screen composite image, and the binary image for the set threshold value.

Figure 10:
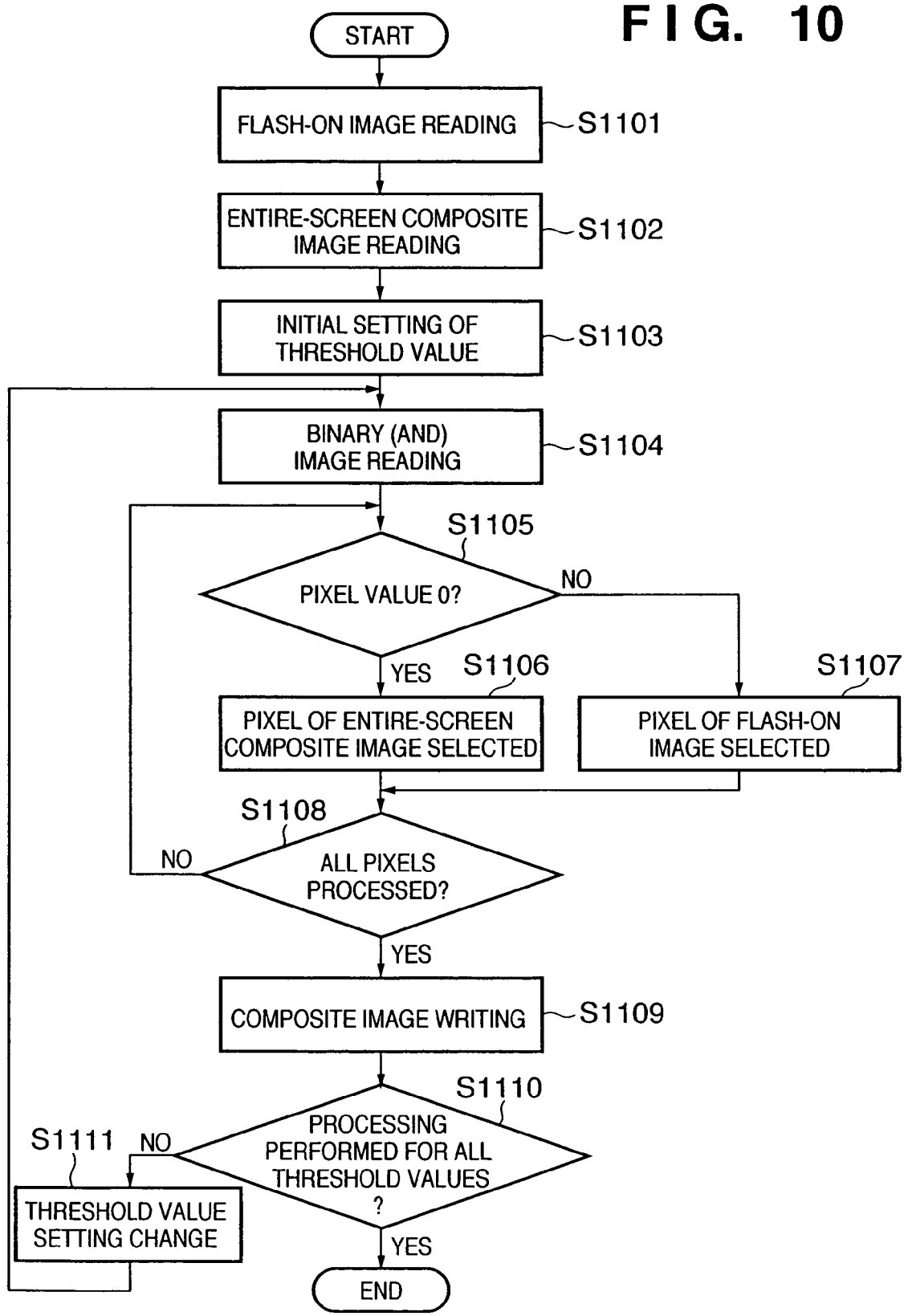
FIG. 10 is a flowchart describing regional composite image generation processing according to the first embodiment of the present invention.

The regional composite image generation method is similar to steps S1105 to S1108 in FIG. 10. In step S1407, it is determined whether or not a threshold value changing operation is performed. This operation is performed by the dial operation or the like described in FIG. 11. When the changing operation is performed, a new threshold value is set in step S1408. Then, generation of a binary image corresponding to the new threshold value (step S1404), correction of the binary image (step S1405), and generation of a regional composite image (step S1406) are repeated. When a threshold value changing operation is not performed, the control proceeds to step S1409, then it is determined whether or not a display mode is set. If a display mode is not set, a regional composite image is displayed in step S1413. This is the initial setting of the display mode. Thereafter, one of the modes: a binary-image display or a composite-image display, is selected. If the display mode has already been set, it is determined whether or not a display mode changing operation is performed in step S1410. When a display mode changing operation is performed, the current mode is confirmed in step S1411. If the display mode is a composite image display mode, the changing operation is reflected and the screen is switched to a binary image display in step S1412. If the display mode is a binary image display mode, the screen is switched to a composite image display in step S1413. The decision operation in step S1414 is to decide the image to be recorded by an operation such as a switch depression. If a decision operation is not performed, the control returns to step S1407, and waits for one of the threshold value changing operation, the display mode changing operation, or the decision operation. When a regional composite image to be recorded is decided and the control exits the processing in step S1414, the decided image is recorded in step S1415. Then, all the processing ends.

FOURTH EMBODIMENT

Hereinafter, the fourth embodiment of the present invention is described. In the first to third embodiments, all processing from the plural image photographing to regional composite image generation are performed inside the digital camera. The fourth embodiment shows an example in which software realizes the processing from the plural image photographing to regional composite image generation. This corresponds to the processing subsequent to step S212 in the flowchart of FIG. 2.

FIG. 9 is a view showing coordination between a personal computer (PC) and a digital camera. It shows that a digital camera 31 is connected to a PC 33 with a cable such as a USB cable 32. This enables the digital camera 31 to exchange image data with the PC 33. Note, instead of cable connection using a USB, the recording unit 119 incorporated in the digital camera 31 may be removed from the digital camera 31 and inserted to a slot 34 of the PC 33 to deliver data. In the PC 33, the software according to the embodiment of the present invention is installed.

Figure 15:
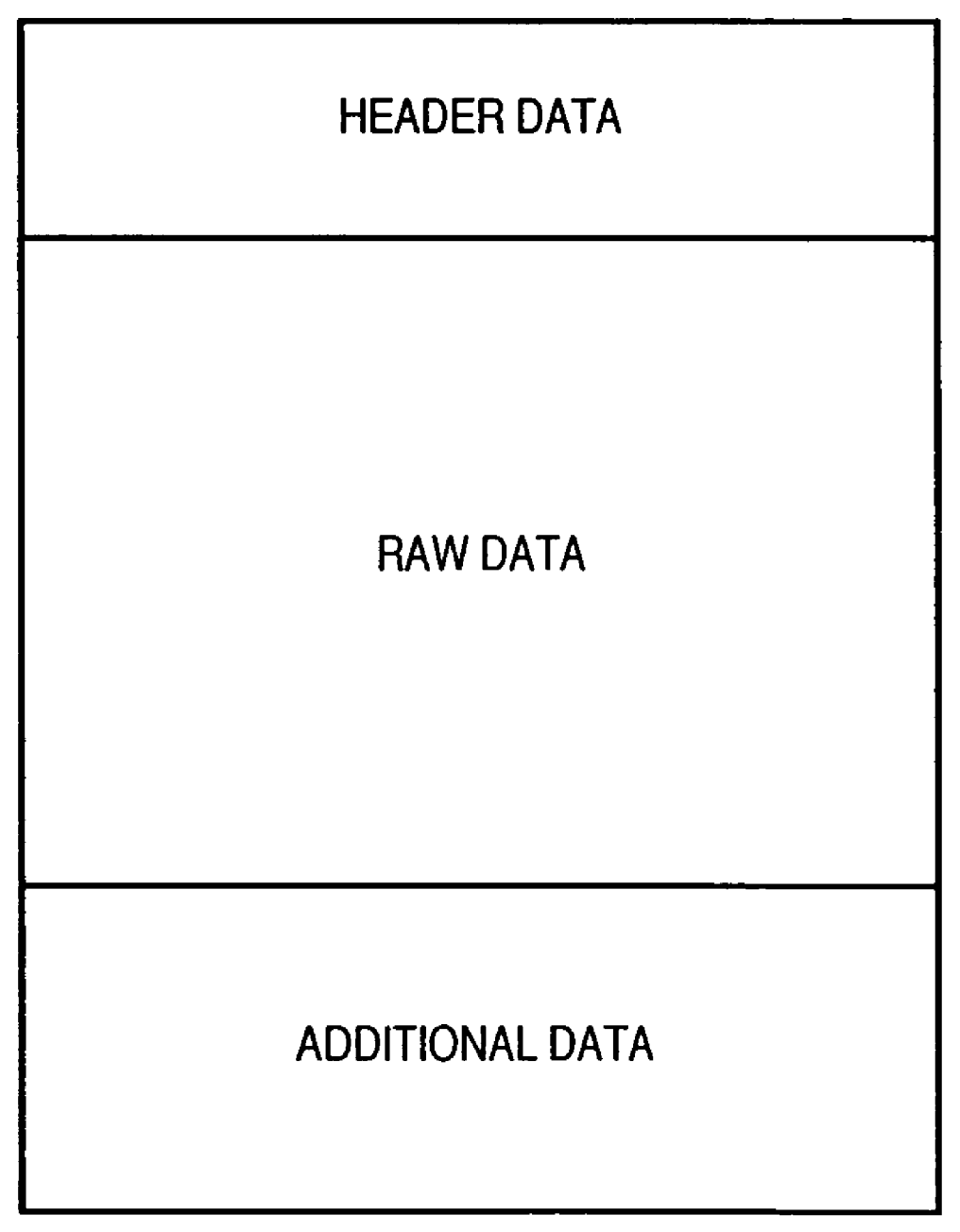

In order to perform image composition by the software, information such as emission or non-emission of flash, an AF sensor's focused region and so on is necessary. Such information is recorded as additional data when a photographed image is recorded. FIG. 15 is a view briefly showing the file format. The additional data is recorded subsequent to the image data itself. The header data includes information such as a data size, the recorded position of additional data, and so on.

FIGS. 16A to 16F are explanatory views of processing for selecting, from the regional composite images for each threshold value, a regional composite image having the most appropriate threshold value by a PC operation. This corresponds to the operation described with reference to FIGS. 14A to 14F. A user interface, such as a slider bar or a button for changing the threshold value, an indicator for showing a set threshold value, a mode selection button and so on, is provided.

Figure 16A:
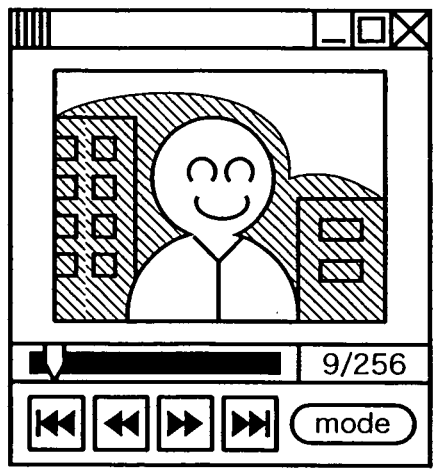
FIGS. 16A to 16F are views showing an example of a user interface for determining a threshold value according to the fourth embodiment of the present invention.
Figure 16B:
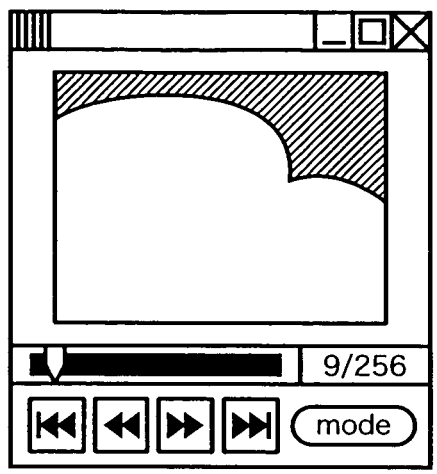
Figure 16C:
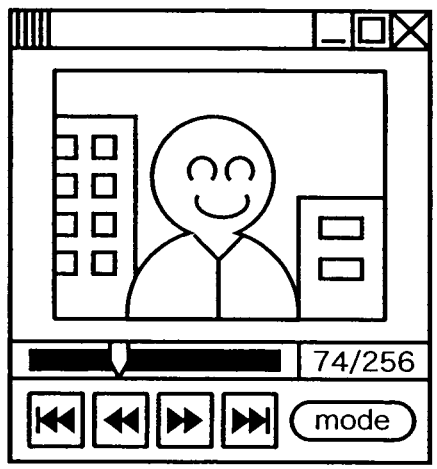
Figure 16D:
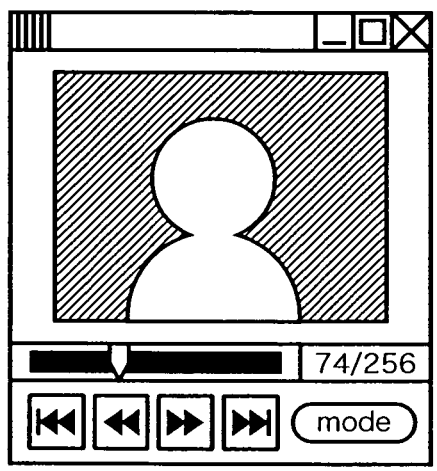
Figure 16E:
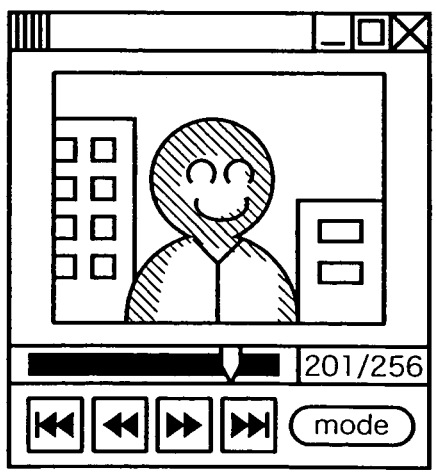
Figure 16F:
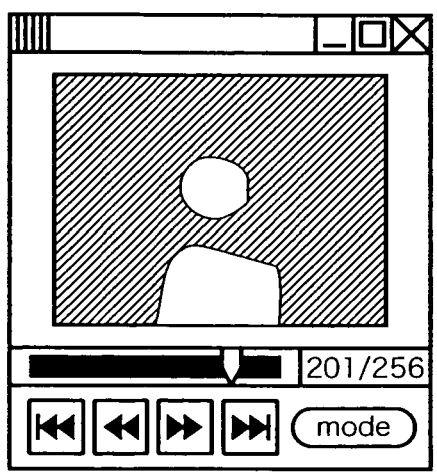
Figure 17A:
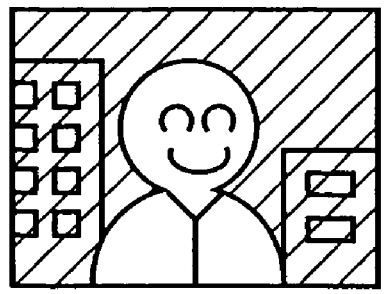
FIG. 17A to FIG. 17E are explanatory views of slow-synchro photographing.
Figure 17D:
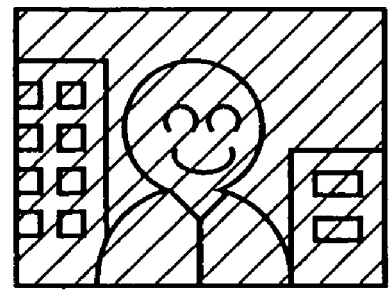
Figure 17B:
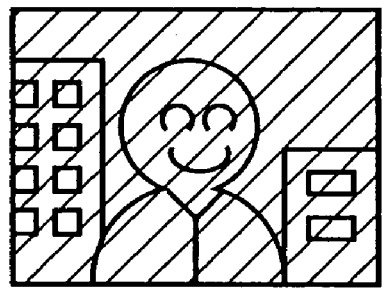
Figure 17E:
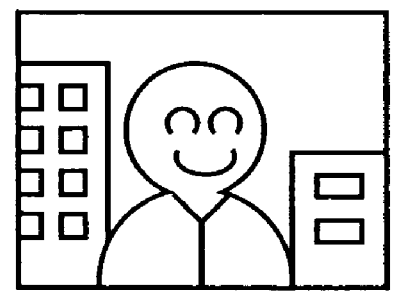
Figure 17C:
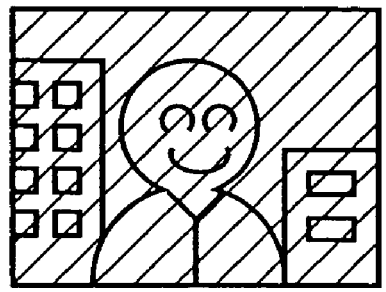

FIG. 16A shows a regional composite image when the value 9 is selected from 256 threshold value levels. FIG. 16B shows a binary image in this setting. When the threshold value is small, the region determined as an object becomes large; thus, a flash-emitted image is selected for a region wider than an actual person. Therefore, in the shaded region shown in FIG. 16A, an image darker than an appropriate exposure is displayed. FIG. 16C shows a regional composite image when the threshold value level is 74, which is an appropriate value. FIG. 16D shows a binary image in this setting, showing that the object region and the background image are appropriately separated. FIG. 16E shows a regional composite image when the threshold value level is 201, which is a large value. FIG. 16F shows a binary image in this setting, showing that the object region is eroded by the background region. Since the entire-screen composite image is selected for the shaded region in FIG. 16E, an image with an appropriate exposure cannot be displayed.

Although the present embodiment assumes that the processing from the plural image photographing to the regional composite image generation are performed by the application program side, the processing up to the position alignment after blur correction, or the processing up to the generation of entire-screen composite image may be performed by the digital camera side. Furthermore, the processing up to the binary image composition, or the processing up to the binary image correction may be performed by the digital camera side. Moreover, the processing up to the regional composite image generation for each threshold value may be performed by the digital camera side, and selection of the most appropriate image from the regional composite images may be performed by the PC side. In other words, as long as information necessary for the processing can be transferred to the PC, the processing can arbitrarily be shared between the digital camera side and the PC side.

The present embodiment can be achieved by providing a computer-readable recording medium (or a storage medium), recording program codes of a software realizing the above-described functions of the embodiment, to a computer system or apparatus, reading the program codes stored in the recording medium by a computer (CPU or MPU) of the system or apparatus, then executing the program. In this case, the program codes read from the recording medium realize the functions according to the above-described embodiment, and the recording medium recording the program codes constitutes the present invention. Furthermore, besides aforesaid functions according to the above embodiment are realized by executing the program codes which are read by a computer, the present invention includes a case where an OS (operating system) or the like working on the computer performs part or the entire processes in accordance with designations of the program codes and realizes functions according to the above embodiment.

Furthermore, the present invention also includes a case where, after the program codes read from the recording medium are written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiments.

In a case where the present embodiment is applied to the aforesaid recording medium, the recording medium stores program codes corresponding to the above-described flowcharts.

The present embodiment can be applied to a system constituted by a plurality of devices (e.g., host computer, interface, reader, printer) or to an apparatus comprising a single device (e.g., copying machine, facsimile machine).

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-268708, filed on Sep. 15, 2004, which is hereby incorporated by reference herein.

The invention claimed is:

1. An image processing apparatus that corrects an image blur by using a plurality of images acquired by an image capturing unit, comprising:
   a blur detection unit adapted to detect a blur amount between the plurality of images;
   a binarized image generation unit adapted to generate one binarized image for a predetermined threshold value by a logical product between a plurality of binarized images, the plurality of binarized images being generated based on the predetermined threshold value by obtaining respective difference values between an image photographed with flash emission and a plurality of images photographed without flash emission, which are aligned based on the blur amount detected by said blur detection unit, among the plurality of images;
   an acquisition unit adapted to acquire region data for separating the image into regions set in units of respective threshold values by changing the threshold value and to generate the binarized images for the respective threshold values by the binarized image generation unit; and
   a display unit adapted to perform a composition of the image photographed with flash emission and the plurality of images photographed without flash emission, based on region data set to one threshold value selected among the respective threshold values and to display the composite image.

2. The image processing apparatus according to claim 1, wherein said binarized image generation unit further performs a correction of the generated binarized image based on focused data after the logical product between the plurality of the binarized images.

3. The image processing apparatus according to claim 1, further comprising an unit adapted to record the composite image displayed by said display unit.

* * * * *